United States Patent
van de Ven et al.

(10) Patent No.: US 9,277,494 B2
(45) Date of Patent: Mar. 1, 2016

(54) REDUCING WIRELESS RECONNECTION TIME OF A COMPUTING DEVICE

(71) Applicants: Adriaan van de Ven, Portland, OR (US); James T. Kukunas, Hillsboro, OR (US)

(72) Inventors: Adriaan van de Ven, Portland, OR (US); James T. Kukunas, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 13/631,430

(22) Filed: Sep. 28, 2012

(65) Prior Publication Data

US 2014/0092755 A1    Apr. 3, 2014

(51) Int. Cl.
*H04W 48/20* (2009.01)

(52) U.S. Cl.
CPC ..................... *H04W 48/20* (2013.01)

(58) Field of Classification Search
None
See application file for complete search history.

(56) References Cited

U.S. PATENT DOCUMENTS

| | | | |
|---|---|---|---|
| 2005/0071476 A1* | 3/2005 | Tejaswini et al. | 709/227 |
| 2006/0142004 A1* | 6/2006 | He et al. | 455/434 |
| 2007/0066304 A1* | 3/2007 | Lee | 455/436 |
| 2008/0182568 A1 | 7/2008 | Kim | |
| 2008/0186882 A1 | 8/2008 | Scherzer et al. | |
| 2009/0042557 A1 | 2/2009 | Vardi et al. | |
| 2009/0305679 A1 | 12/2009 | Kim | |
| 2010/0303051 A1 | 12/2010 | Umeuchi et al. | |
| 2011/0106930 A1* | 5/2011 | Lee et al. | 709/223 |
| 2012/0163260 A1 | 6/2012 | Yeo | |
| 2012/0170471 A1* | 7/2012 | Brown et al. | 370/252 |
| 2012/0178488 A1 | 7/2012 | Jonker et al. | |
| 2014/0092805 A1 | 4/2014 | van de Ven et al. | |

FOREIGN PATENT DOCUMENTS

| | | |
|---|---|---|
| KR | 1020110047772 A | 5/2011 |
| KR | 1020120012908 A | 2/2012 |
| KR | 1020120070707 A | 7/2012 |
| KR | 1020120106292 A | 9/2012 |
| WO | 2006066181 A1 | 6/2006 |
| WO | 2009134587 A2 | 11/2009 |
| WO | 2014052758 A1 | 4/2014 |

(Continued)

OTHER PUBLICATIONS

International Search Report and Written Opinion received for PCT Application No. PCT/US2013/062320, mailed on Jan. 2, 2014, 9 pages.

(Continued)

*Primary Examiner* — Habte Mered
(74) *Attorney, Agent, or Firm* — Barnes & Thornburg LLP

(57) ABSTRACT

Technologies for reducing connection time to a wireless access point includes recording wireless connection information in a log, computing parameters as a function of past wireless connection information in the log, generating an ordered list of wireless access points most likely to be available for reconnection at a desired time as a function of recent wireless connection information in the log, and directly probing a wireless access point instead of initiating a wireless access point scan. In some embodiments, computing parameters as a function of past wireless connection information in the log comprises performing genetic programming operations to generate prediction programs for later prediction of wireless access points most likely to be available for reconnection at a desired time.

25 Claims, 6 Drawing Sheets

(56) References Cited

FOREIGN PATENT DOCUMENTS

WO  2014052767 A1  4/2014
WO  2014052839 A1  4/2014

OTHER PUBLICATIONS

International Search Report and Written Opinion received for International Patent Application No. PCT/US2013/062320, mailed on Jan. 29, 2014, 10 pages.

International Search Report and Written Opinion received for International Patent Application No. PCT/US2013/062188, mailed on Jan. 2, 2014, 9 pages.

Han et al., "Directional Handoff using Geomagnetic Sensor in Indoor WLANs," 2012 IEEE International Conference on Pervasive Computing and Communications (PerCom), Mar. 19-23, 2012, 7 pages.

Park et al., "Step-wise Active Scanning in TGai," Presentation, IEEE Document: IEEE 802.11-12/0257r1, Mar. 3, 2012, 10 pages.

Nicholson et al., "Improved Access Point Selection," Proceedings of the 4th international conference on Mobile systems (MobiSys '06), applications and services, Jun. 19-22, 2006, pp. 233-245.

Poli et al., "A Field Guide to Genetic Programming," 2008, published via http://lulu.com and freely available at http://www.gp-field-guide.org.uk, 250 pages.

Van De Ven et al., "Mixed Off-site/On-site Prediction Computation for Reducing Wireless Reconnection Time of a Computing Device," U.S. Appl. No. 13/631,439, filed Sep. 28, 2012, 53 pages.

International Search Report and Written Opinion received for Patent Application No. PCT/US2013/062202, mailed on Jan. 24, 2014, 9 pages.

\* cited by examiner

REDUCING WIRELESS RECONNECTION TIME OF A COMPUTING DEVICE

BACKGROUND

Modern computing devices, such as laptops, smartphones, mobile internet devices (MIDs), and tablets, often include functionality for wirelessly connecting with one or more networks. Such functionality is increasingly important to users of computing devices that often travel between any number of different locations, but still require access to network-based content and services provided by a remote computing device or server. In providing such access, a computing device may wirelessly connect with one or more different wireless access points, each of which are connected to a network, such as the Internet.

To decrease the amount of time required to reconnect to a particular wireless access point, a computing device may save a password and an identifier associated with each wireless access point for which the computing device connects. As such, when scanning for available wireless access points with which to connect, the computing device may receive an identifier that matches one of the saved identifiers. In response, the computing device may reconnect with the wireless access point associated with the received identifier using the corresponding password and thereby decrease the amount of time needed to connect. However, saving an identifier and a password for each wireless access point for which the computing device connects does not typically decrease the amount of time needed to scan for available wireless access points with which to connect.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
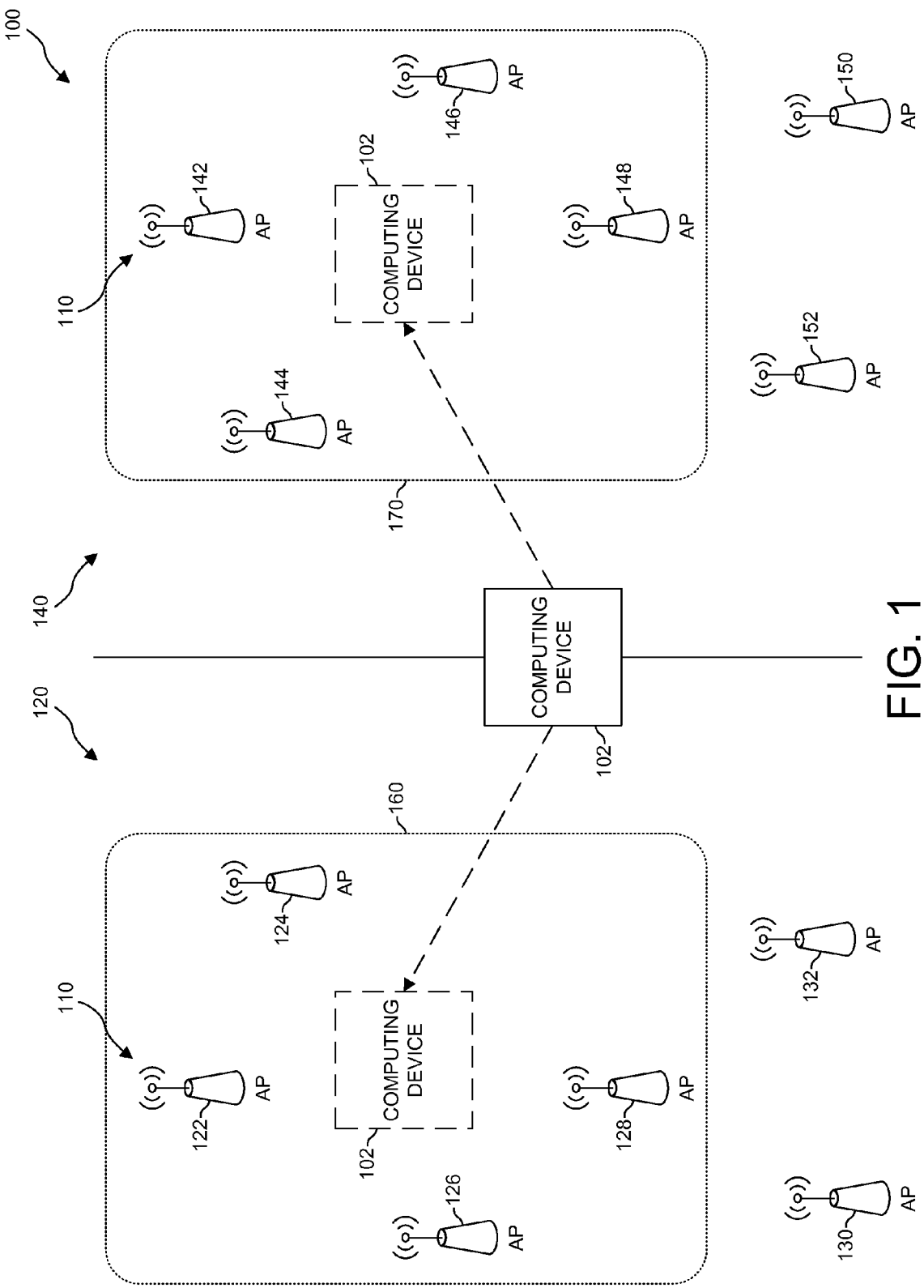
FIG. 1 is a simplified block diagram of at least one embodiment of a system for predicting an available wireless access point to reduce wireless reconnection time of a computing device.
Figure 2:
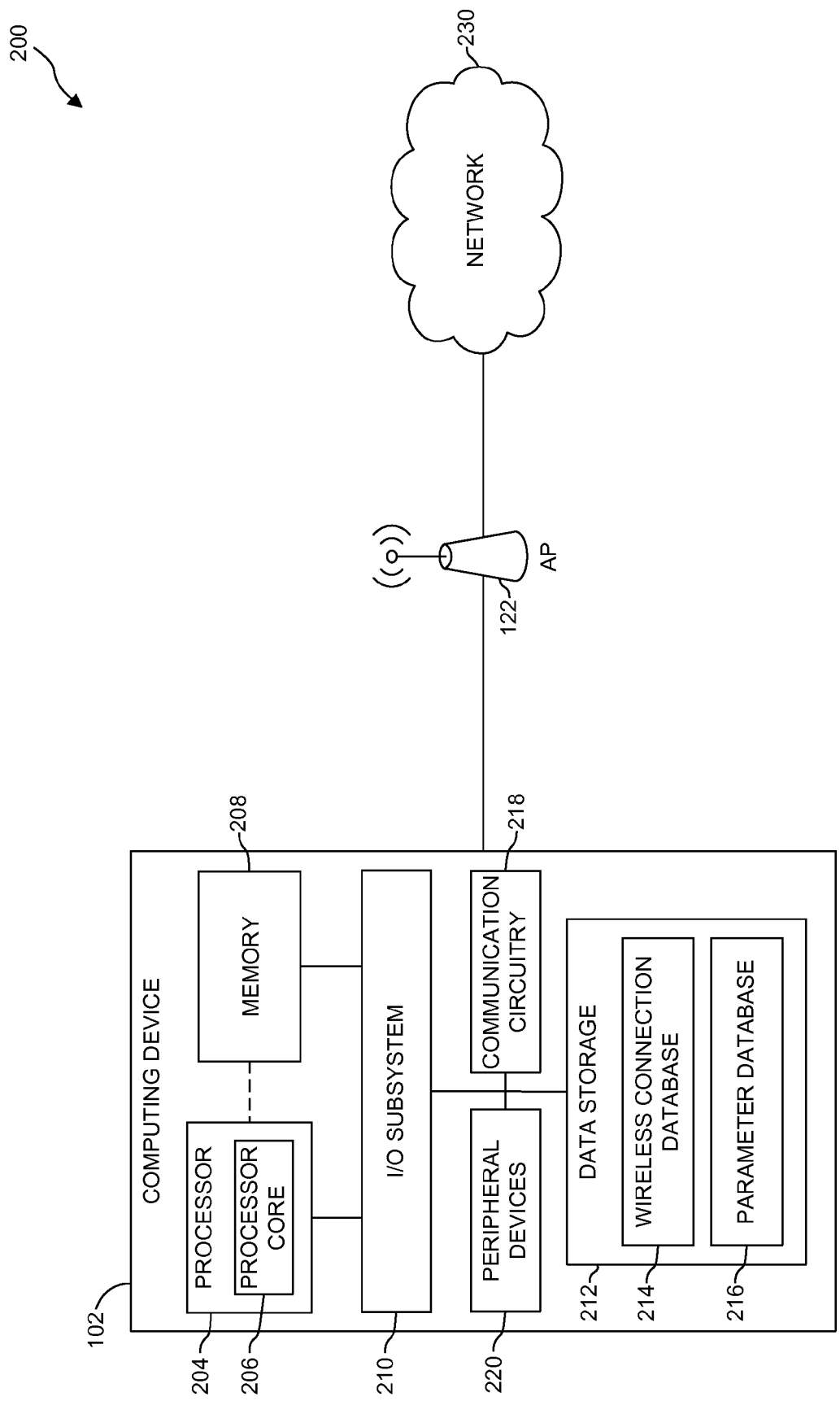
FIG. 2 is a simplified block diagram of at least one embodiment of a system for wirelessly reconnecting the computing device of FIG. 1 to a wireless access point.
Figure 4:
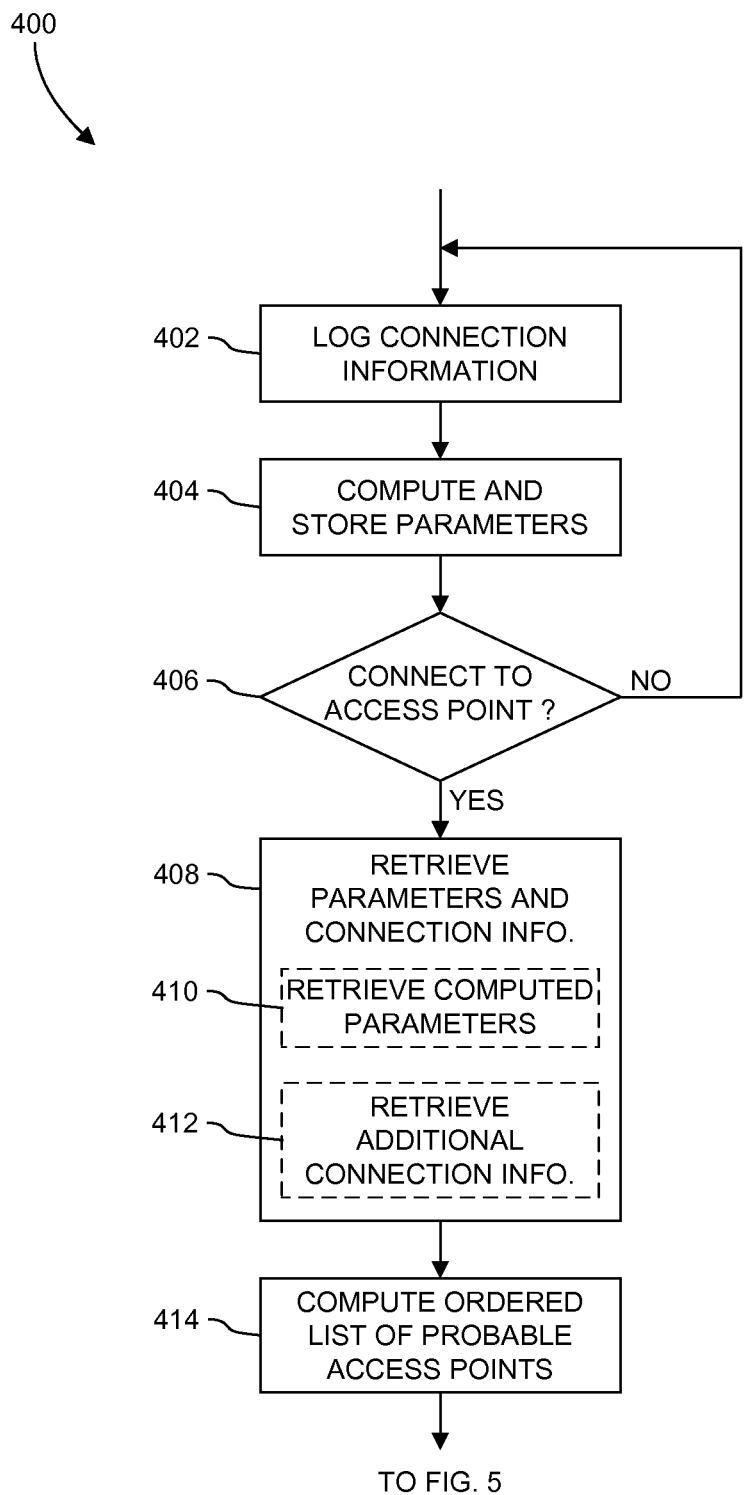
Figure 5:
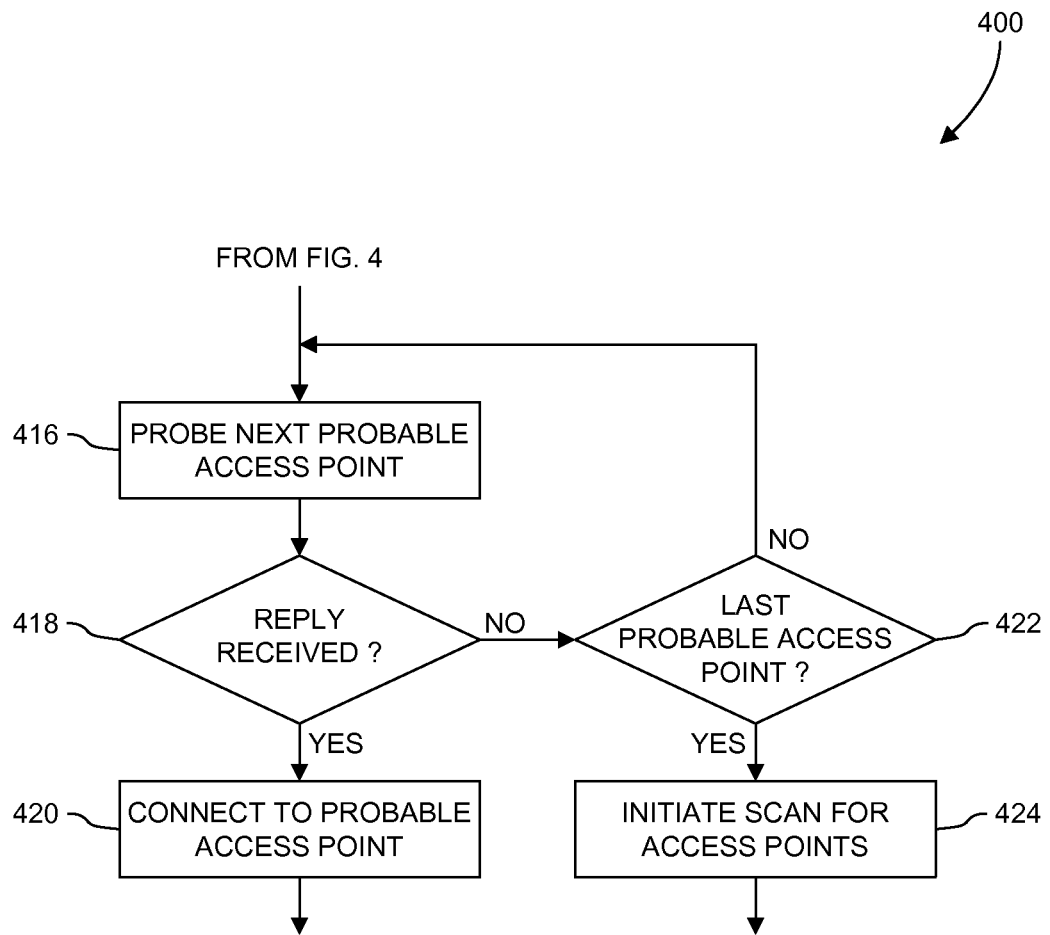
Figure 6:
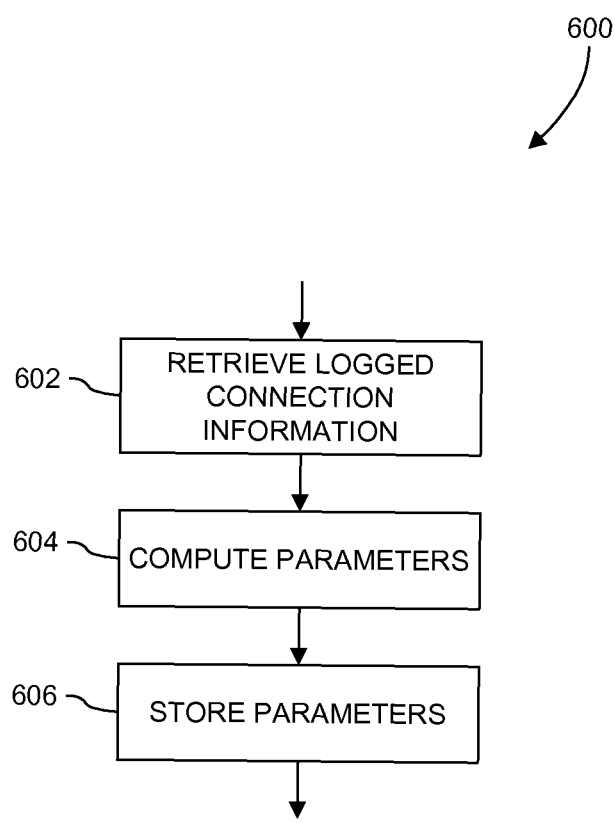

FIGS. 4 and 5 are simplified flow diagrams of at least one embodiment of a method for predicting an available wireless access point to reduce the wireless reconnection time between a wireless access point and the computing device of FIGS. 1 and 2; and FIG. 6 is a simplified flow diagram of at least one embodiment of a method for computing parameters with the computing device of FIGS. 1 and 2 to predict an available wireless access point.

DETAILED DESCRIPTION OF THE DRAWINGS

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for reducing an amount of time required to re-establish a wireless connection comprises a computing device 102 and one or more wireless access points 110. The computing device 102 may attempt to re-establish a wireless connection with one or more of the wireless access points 110 based at least in part on, or otherwise as a function of, historical connection information and a current context of the computing device 102. Additionally or alternatively, the computing device 102 may predict a group 160, 170 of the wireless access points 110 most likely (e.g., most probable) to be in range of the computing device 102 at a given time. To do so, the computing device 102 may analyze both historical connection information and the current context of the computing device 102 to determine the likelihood (e.g., the probability) that each of the wireless access points 110 will be available for reconnection (e.g., accessible, in range of the computing device 102, etc.) at the given time. Based at least in part on, or otherwise as a function of, that analysis, the computing device 102 may generate an ordered list comprising a reference number of the wireless access points 110 having the highest probabilities of being available for reconnection (e.g., the top four wireless access points 110). That is, the computing device 102 may generate an ordered list of the wireless access points 110 arranged in a descending manner according to the probability determined for each.

In some embodiments, the computing device 102 may predict different groups 160, 170 and generate corresponding ordered lists of the wireless access points 110 based at least in part on, or otherwise as a function of, the historical connection information and/or the context of the computing device 102. For example, the computing device 102 may be utilized in any number of different locations 120, 140 based on a particular day of the week or a particular time of day. That is, the computing device 102 may be operated in one location 120 (e.g., at an office building) during the week and in another location 140 (e.g., at home) on weekends. In each of the locations 120, 140, the computing device 102 may establish a wireless connection to, or otherwise come into contact with, any number of different wireless access points 110. For example, while located in an office building during the week (e.g., location 120), the computing device 102 may establish one or more wireless connections and/or come into contact with any number of the wireless access points 110 (e.g., AP 122, AP 124, AP 126, AP 128, AP 130, and AP 132). In contrast while located at home on weekends (e.g., location 140), the computing device 102 may establish one or more wireless connections and/or come into contact with any number of different wireless access points 110 (e.g., AP 142, AP 144, AP 146, AP 148, AP 150, and AP 152). In such embodiments, the computing device 102 may predict that a group 160, 170 of the wireless access points 110 is more likely to be available for re-establishment of a wireless connection at a particular time. For example, the computing device 102 may determine that a group 160 of the wireless access points 110 (e.g., AP 122, AP 124, AP 126, and AP 128) is more likely to be available to re-establish a wireless connection than the other wireless access points 110 (e.g., AP 130 and AP 132) based at least in part on, or otherwise as a function of, the time of day or the day of the week being predicted.

It should be understood that there may be any number of additional wireless access points 110 in either location 120, 140. In addition, it should be further understood that although only two different locations 120, 140 and types of locations (e.g., an office building and a home) are described in the illustrative embodiment, the computing device 102 may establish a wireless connection to and/or come into contact with any number of different wireless access points 110 in any number of locations 120, 140 and/or any other type of location. For example, in some embodiments, the computing device 102 may establish a wireless connection with one or more of the wireless access points 110 at an airport, a retail store, a restaurant, a hotel, and/or any other type of location comprising one or more of the wireless access points 110.

To reduce the amount of time needed to re-establish a wireless connection, the computing device 102 may transmit a probe frame or a directed connection request to one or more of the wireless access points 110 based at least in part on, or otherwise as a function of, the ordered list. If one or more of the wireless access points 110 are in range of the computing device 102 when probed, the one or more in-range wireless access points 110 can generate and thereafter transmit a response to the probe frame. Upon receipt of a probe response, the computing device 102 may re-establish a wireless connection with the corresponding wireless access point 110. By predicting and directly probing the wireless access points 110 that are most likely to be available to re-establish a wireless connection at a given time, the computing device 102 need not initiate a wireless access point scan, which typically takes a noticeable amount of time to complete. In that way, the time needed to re-establish a wireless connection may be reduced.

The computing device 102 may be embodied as any type of computing device for processing data and communicating with remote devices. In the illustrative embodiment of FIG. 2, the computing device 102 includes a processor 204, an I/O subsystem 210, a memory 208, a data storage 212, communication circuitry 218, and one or more peripheral devices 220. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, subcomponents, and devices commonly found in a computing device, which are not illustrated in FIG. 2 for clarity of the description.

The processor 204 of the computing device 102 may be embodied as any type of processor capable of executing software/firmware, such as a microprocessor, digital signal processor, microcontroller, or the like. The processor 204 is illustratively embodied as a single core processor having a processor core 206. However, in other embodiments, the processor 204 may be embodied as a multi-core processor having multiple processor cores 206. Additionally, the computing device 102 may include additional processors 204 having one or more processor cores 206.

The I/O subsystem 210 of the computing device 102 may be embodied as circuitry and/or components to facilitate input/output operations with the processor 204 and/or other components of the computing device 102. In some embodiments, the I/O subsystem 210 may be embodied as a memory controller hub (MCH or "northbridge"), an input/output controller hub (ICH or "southbridge"), and a firmware device. In such embodiments, the firmware device of the I/O subsystem 210 may be embodied as a memory device for storing Basic Input/Output System (BIOS) data and/or instructions and/or other information (e.g., a BIOS driver used during booting of the computing device 102). However, in other embodiments, I/O subsystems having other configurations may be used. For example, in some embodiments, the I/O subsystem 210 may be embodied as a platform controller hub (PCH). In such embodiments, the memory controller hub (MCH) may be incorporated in or otherwise associated with the processor 204, and the processor 204 may communicate directly with the memory 208 (as shown by the hashed line in FIG. 2). Additionally, in other embodiments, the I/O subsystem 210 may form a portion of a system-on-a-chip (SoC) and be incorporated, along with the processor 204 and other components of the computing device 102, on a single integrated circuit chip.

The processor 204 is communicatively coupled to the I/O subsystem 210 via a number of signal paths. These signal paths (and other signal paths illustrated in FIG. 2) may be embodied as any type of signal paths capable of facilitating communication between the components of the computing device 102. For example, the signal paths may be embodied as any number of wires, cables, light guides, printed circuit board traces, via, bus, intervening devices, point-to-point interconnects, and/or the like.

The memory 208 of the computing device 102 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 208 is communicatively coupled to the I/O subsystem 210 via a number of signal paths. Although only a single memory device 208 is illustrated in FIG. 2, the computing device 102 may include additional memory devices in other embodiments. Various data and software may be stored in the memory device 208. For example, one or more operating systems (OS), applications, programs, libraries, and drivers that make up the software stack executed by the processor 204 may reside in memory 208 during execution.

The data storage 212 may be embodied as any type of device or devices configured for the short-term or long-term storage of data such as, for example, memory devices and circuits, memory cards, hard disk drives, solid-state drives, or other data storage devices. In some embodiments, the data storage 212 may be used to store data associated with past and present connections with one or more wireless access points such as, for example, AP 122. Additionally or alternatively, the data storage 212 may also be used to store parameters used to facilitate predicting which of the one or more wireless access points 110 to connect to. To do so, the data storage 212 may include one or more databases such as, for example, a wireless connection database 214 and a parameter database 216. In such embodiments, the wireless connection database 214 may comprise data associated with one or more wireless connections (e.g., connection start time and date, connection end time and date, connection duration, etc.) or information corresponding to one or more of the wireless access points 110 with which the computing device 102 connects (e.g., service set identifier, wireless channel, media access control address, etc.). The parameter database 216 may contain, in some embodiments, one or more prediction parameters computed using one or more algorithms.

The communication circuitry 218 of the computing device 102 may be embodied as any number of devices and circuitry for enabling communications between the computing device 102 and one or more remote computing devices over the network 230. For example, the communication circuitry 218 may be embodied as a network interface controller (NIC) in some embodiments. The network 230 may be embodied as any number of various wired and/or wireless communication networks. For example, the network 230 may be embodied as or otherwise include a local area network (LAN), a wide area network (WAN), a mobile network, or a publicly-accessible, global network such as the Internet. Additionally, the network 230 may include any number of additional devices to facilitate communication between the computing device 102 and the remote computing devices. The computing device 102 and the remote computing devices may use any suitable communication protocol to communicate with each other over the network 230 depending on, for example, the particular type of network(s) 220. Additionally, in some embodiments, the communication circuitry 218 may wirelessly connect to the one or more wireless access points 110, which may be communicatively coupled to the network 230. For example, the communication circuitry 218 may wirelessly connect to the AP 122, which may be communicatively coupled to the network 230. In such embodiments, the communication circuitry 218 may communicate with the remote computing devices over the network 230 using the AP 122.

The peripheral devices 220 of the computing device 102 may include any number of additional input/output devices, interface devices, and/or other peripheral devices. For example, the peripheral devices 220 may include a display for displaying content to a user, a keyboard, mouse, or other input/output peripheral devices. The peripheral devices 220 are communicatively coupled to the I/O subsystem 210 via a number of signal paths thereby allowing the I/O subsystem 210 and/or processor 204 to receive inputs from and send outputs to the peripheral devices 220.

The wireless access points 110 may be embodied as any type of computing and/or communication device capable of performing the functions described herein. As such, the wireless access points 110 may include various hardware and software components (e.g., a processor, memory, and communication circuitry) typically found in a computing device for communicating, storing, forwarding, maintaining, receiving, and transferring data over the network 230.

Figure 3:
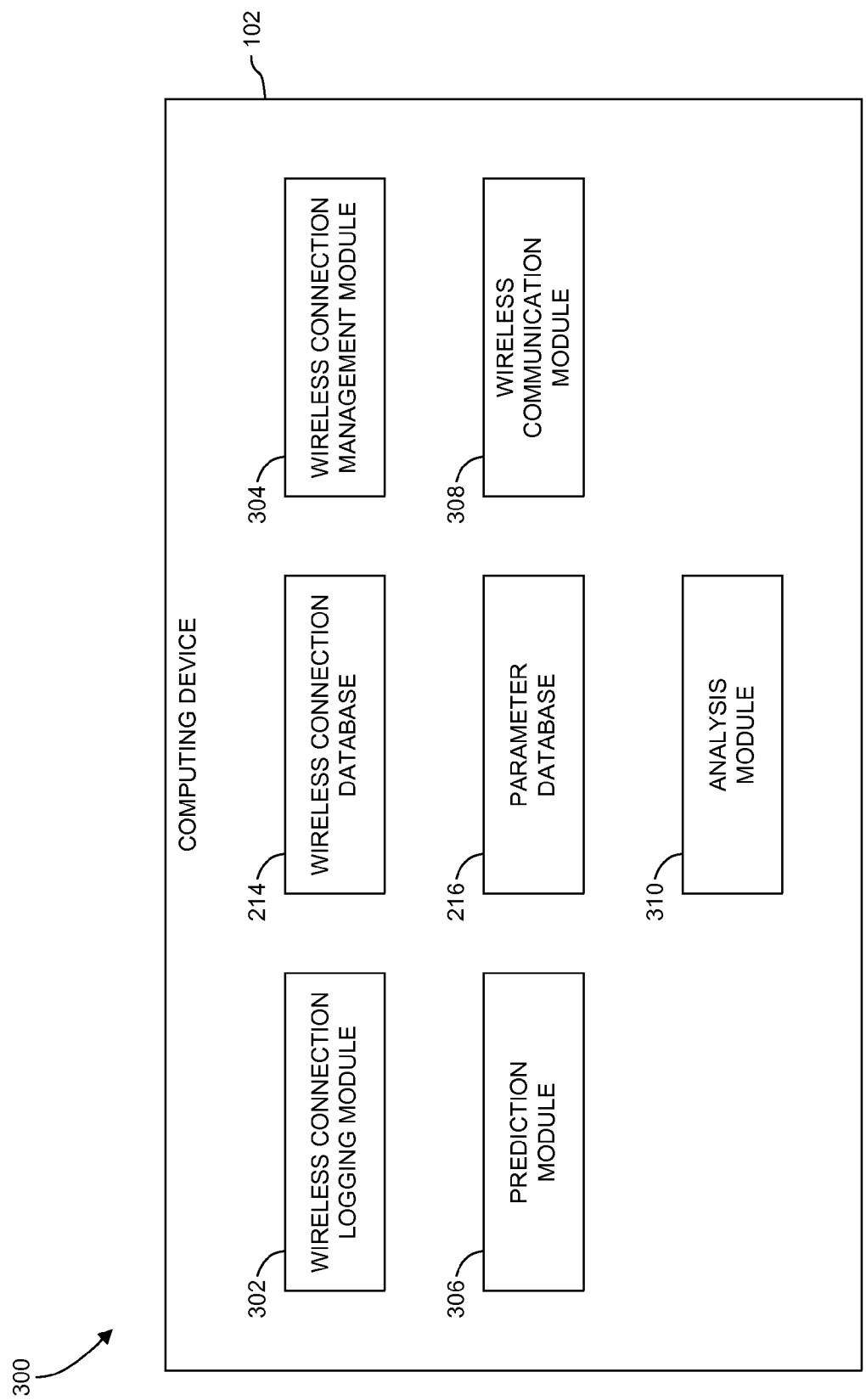
FIG. 3 is a simplified block diagram of at least one embodiment of an environment of the computing device of FIGS. 1 and 2.

Referring now to FIG. 3, one embodiment of an environment 300 of the computing device 102 includes a wireless connection logging module 302, a wireless connection management module 304, a prediction module 306, a wireless communication module 308, an analysis module 310, the wireless connection database 214, and the parameter database 216. It should be understood that the environment 300, and/or any of the modules included therein, may be implemented in hardware, firmware, software, or any combination thereof.

As discussed above, in some embodiments, the computing device 102 may establish a wireless connection with one or more of the wireless access points 110. To do so, the wireless communication module 308 may perform a scan to identify one or more wireless access points 110 located within a proximity of the computing device 102. In response to identifying one or more wireless access points 110 located within the proximity of the computing device 102, the wireless communication module 308 may connect to one of the wireless access points 110. Additionally, in some embodiments, the wireless communication module 308 may re-establish a wireless connection with one or more of the wireless access points 110.

The wireless communication module 308 may be communicatively coupled to the wireless connection management module 304. The wireless communication module 308 may facilitate establishing and/or re-establishing a connection with the one or more wireless access points 110. In use, the wireless connection management module 304 may instruct the wireless communication module 308 to initiate a scan to identify the wireless access points 110 located in the proximity of the computing device 102. Additionally or alternatively, the wireless connection management module 304 may instruct the wireless communication module 308 to directly probe one or more of the wireless access points 110 instead of initiating a scan. For example, in some embodiments, the wireless connection management module 304 may instruct the wireless communication module 308 to send a probe to a reference number of the wireless access points 110 corresponding to the wireless access points 110 with which the computing device 102 has the highest probability of reconnecting. In some embodiments, the wireless connection management module 304 may also instruct the wireless communication module 308 to directly probe one or more of the wireless access points 110 as a function of a manual wireless connection configuration provided by a user of the computing device 102.

The wireless connection logging module 302 may record connection information corresponding to one or more past or present wireless connections established between the wireless communication module 308 and the one or more wireless access points 110. The connection information may comprise information describing the wireless connections themselves (e.g., connection start time and date, connection end time and date, connection duration, etc.) or information describing characteristics or data associated with the one or more wireless access points 110 with which the computing device 102 connects (e.g., service set identifier, wireless channel, media access control address, etc.).

In some embodiments, the wireless connection logging module 302 may be configured to store the connection information in a log, which may be embodied as one or more databases. For example, the wireless connection logging module 302 may store the connection information in the wireless connection database 214. It should be understood that although the log is described as being embodied as a database in the illustrative embodiment, the log may be embodied as data stored in data structure (e.g., a document, file, etc.) having a different format in other embodiments. For example, the log may be embodied as a comma-separated value (CSV) file, a text file, an encrypted data file, an Extensible Markup Language (XML) document having one or more XML elements, or any other format suitable to store information associated with one or more past or present wireless connections between the computing device 102 and the one or more wireless access points 110. Additionally, it should be understood that the wireless connection logging module 302 may instead be configured to store the connection information in any suitable data storage and/or memory device (e.g., volatile and/or non-volatile memory devices) of the computing device 102.

At certain intervals, which may correspond to a reference interval in some embodiments, the analysis module 310 may retrieve historical connection information stored in the wireless connection database 214 and compute one or more parameters, which may later be used to facilitate predicting which of the one or more wireless access points 110, or the group 160, 170 of the one or more wireless access points 110, is most likely (e.g., most probable) to be in range of the computing device 102 at a given time. For example, the analysis module 310 may retrieve the historical connection information stored in the wireless connection database 214 and compute the one or more parameters according to a configurable reference interval or schedule (e.g., every hour, every four hours, once or twice a day, once or twice a week, once or twice a month, at a scheduled date and/or time, or according to any other appropriate reference interval or schedule).

In some embodiments, the analysis module 310 may also be configured to operate asynchronously to other components and operations of the computing device 102 in response to the occurrence of one or more reference events or conditions. For example, the analysis module 310 may be configured to operate only when it is detected that the computing device 102 is not actively being used (e.g., overnight, idle, etc.) and/or in response to the computing device 102 being connected to a power source. Additionally or alternatively, the analysis module 310 may be configured to operate only when other operations of the computing device 102 (connection attempts, virus scans, read/write operations, system maintenance, etc.) are not being performed. It should be understood that any suitable event and/or condition may trigger operation of the analysis module 310. Additionally, it should be appreciated that the analysis module 310, in some embodiments, may operate synchronously (e.g., contemporaneously) to other components and operations of the computing device 102.

As discussed, the analysis module 310 computes one or more parameters, which may later be used to facilitate predicting which of the one or more wireless access points 110, or the group 160, 170 of the one or more wireless access points 110, is most likely to be in range of the computing device 102 at a particular time. To do so, the analysis module 310 may utilize one or more artificial intelligence-based techniques to compute or otherwise generate the parameters as a function of the historical connection information. For example, the analysis module 310 may utilize one or more genetic algorithms to compute a set of parameters in some embodiments. In such embodiments, each parameter in the set of parameters may be computed from the historical connection information. As such, each parameter may be embodied as a numeric constant that represents a probability of a previous wireless connection having occurred. For example, the set of parameters computed by the analysis module 310 may comprise: a parameter indicative of the probability that a wireless connection established at a particular time of reference was the same as the last wireless connection (e.g., the previous wireless connection) that was established; a parameter indicative of the probability that the wireless connection established at the particular time of reference was the same as the wireless connection that was established 24 hours before the particular time of reference; and a parameter indicative of the probability that the wireless connection established at the particular time of reference was the same as the wireless connection that was established one week before the particular time of reference. In that way, the analysis module 310 may compute [0.4, 0.35, 0.25] as the set of parameters, wherein 0.4 may be indicative of the probability that the wireless connection established at the particular time of reference (e.g., Tuesday at 5:00 PM) was the same as the last wireless connection that was established (e.g., Tuesday at 3:00 PM, Monday at 10:00 PM, etc.); 0.35 may be indicative of the probability that the wireless connection established at the particular time of reference (e.g., Tuesday at 5:00 PM) was the same as the wireless connection that was established 24 hours before (e.g., Monday at 5:00 PM) the particular time of reference; and 0.25 may be indicative of the probability that the wireless connection established at the particular time of reference (e.g., Tuesday at 5:00 PM) was the same as the wireless connection that was established one week before (e.g., 'last' Tuesday at 5:00 PM) the particular time of reference.

It should be understand that although only three parameters are computed in the illustrative embodiment, any number of different parameters having different probabilities may be computed in other embodiments. For example, the analysis module 310 of some embodiments may compute a parameter indicative of the probability that the wireless connection established at a particular time of reference was the same as the wireless connection that was established one hour before the particular time of reference, a parameter indicative of the probability that the wireless connection established at a particular time of reference was the same as the wireless connection that was established one month before the particular time of reference, or any additional parameter suitable for indicating the probability that a wireless connection established at a particular time was the same as another wireless connection established in the past.

In some embodiments, the analysis module 310 may utilize one or more genetic programming techniques to compute a set of parameters. In such embodiments, each parameter in the set of parameters may instead be embodied as one or more prediction programs (e.g., instructions, program sequences, etc.), which may be later executed by the prediction module 306 to facilitate predicting which of wireless access points 110, or the group 160, 170 of the wireless access points 110, are most likely (e.g., most probable) to be in range of the computing device 102 at a given time.

In some embodiments, the one or more artificial intelligence-based techniques (e.g., genetic algorithms, genetic programming, etc.) used to compute the parameters and/or generate the prediction programs may be computationally and/or resource intensive on the computing device 102. This is especially true in embodiments wherein the computing device 102 comprises a mobile computing device (e.g., a smartphone, tablet computer, e-reader, laptop computer, personal digital assistant, etc.) or any other type of computing device capable of fully or partially operating using a limited or reduced power source (e.g., a battery, hand-power crank, photovoltaic cell, etc.). Therefore, as discussed above, the analysis module 310 may be configured, in some embodiments, to operate asynchronously to other components and operations of the computing device 102 in response to the occurrence of one or more reference events or conditions (e.g., inactivity of the computing device 102, connection to a power source, etc.). As such, the analysis module 310 may operate only when the resources (e.g., power level, battery level, processing capacity, etc.) of the computing device 102 are adequate to perform such computations. In that way, the amount of power and other resources of the computing device 102 may be conserved.

It should be understood that although only genetic algorithms and genetic programming techniques are described as being capable of being utilized to compute the parameters and/or generate the prediction programs in the illustrative embodiment, the analysis module 310 may utilize any other technique suitable for computing parameters or generating prediction programs that later facilitate predicting which of the one or more wireless access points 110, or the group 160, 170 of the one or more wireless access points 110, is most likely (e.g., most probable) to be in range of the computing device 102 at a given time. For example, the analysis module 310 may compute, generate, and/or determine one or more algorithms best suited (e.g., most optimal) for later use in predicting which of the one or more wireless access points 110, or the group 160, 170 of the one or more wireless access points 110, is most likely (e.g., most probable) to be in range of the computing device 102 at a given time.

In some embodiments, the analysis module 310 may be configured to store the computed parameters and/or generated prediction programs in one or more databases. For example, the analysis module 310 may store the computed parameters and/or generated prediction programs in the parameter database 216. Of course, it should be understood that the analysis module 310 may instead be configured to store the computed parameters and/or generated prediction programs in any suitable data storage and/or memory device (e.g., volatile and/or non-volatile memory devices) of the computing device 102.

To facilitate predicting which of the one or more wireless access points 110, or the group 160, 170 of the one or more wireless access points 110, is most likely (e.g., most probable) to be in range of the computing device 102 at a given time, the prediction module 306 may be communicatively coupled to the wireless connection management module 304, the wireless connection database 214, and the parameter database 216. In use, the prediction module 306 may receive a notification and/or an indication from the wireless connection management module 304 that re-establishment of a wireless connection has been requested. In response, the prediction module 306 may retrieve the one or more parameters and/or prediction programs from the parameter database 216. Additionally, the prediction module 306 may retrieve additional wireless connection information from the wireless connection database 214. In some embodiments, the additional wireless connection information retrieved from the wireless connection database 214 may include the most recent connection information stored in the log by the wireless connection logging module 302. That is, the most recent connection information retrieved from the wireless connection database 214 may include wireless information corresponding to one or more recent wireless connections for which the analysis module 310 has not yet computed into a parameter or a prediction program.

In use, the prediction module 306 may predict different groups 160, 170 of the wireless access points 110 being most likely to be in range of or otherwise available to the computing device 102 at a desired day of the week and/or time of prediction. In embodiments wherein the parameters computed by the analysis module 310 are embodied as numeric constants indicative of connection probabilities derived from the historical connection information, the prediction module 306 may use the previously computed parameters, the additional (e.g., most recent) connection information retrieved from the wireless connection database 214, and a desired time of prediction as inputs into a generic (e.g., standard, predefined, default, common, etc.) algorithm or formula to generate an ordered list. In such embodiments, the prediction module 306 may retrieve parameters from the parameter database 216 that correspond to the desired day of the week and/or time of prediction, but that occurred in the past (e.g., parameters generated from historical connection information). For example, if the prediction module 306 determines that the desired day of the week and/or time of prediction corresponds to the present day of the week and time (e.g., Tuesday at 5:00 PM), then the prediction module 306 may retrieve a set of previously computed parameters for the same day of the week and time using the historical connection information (last four Tuesdays at 5:00 PM, last three Tuesdays at 5:00 PM, etc.).

The prediction module 306 may then determine which of the most recent wireless connections (e.g., the wireless connections corresponding to connection information for which the analysis module 310 has not yet computed into a parameter or a prediction program) are most likely to be available for reconnection at the desired time of prediction (e.g., Tuesday at 5:00 PM). To do so, the prediction module 306 may assign the connection probabilities associated with each of the previously computed parameters (e.g., 0.4, 0.35, 0.25) to the most recent connection information. For example, the prediction module 306 may assign a probability of 0.4 to the last (e.g., the previous) wireless connection that was established (e.g., Tuesday at 3:00 PM, Monday at 10:00 PM, etc.), a probability of 0.35 to the wireless connection that was established 24 hours before (e.g., Monday at 5:00 PM) the desired time of prediction (e.g., Tuesday at 5:00 PM), and a probability of 0.25 to the wireless connection what was established one week (e.g., 'last' Tuesday at 5:00 PM) before the desired time of prediction (e.g., Tuesday at 5:00 PM).

In response to determining which of the most recent wireless connections are most likely to be available for reconnection at the desired time (e.g., Tuesday at 5:00 PM), the prediction module 306 may identify which of the wireless access points 110 (e.g., AP 122, AP 124, AP 126, etc.) correspond to those wireless connections and generate the ordered list therefrom. To do so, the prediction module 306 may use any information describing the characteristics or data associated with the corresponding wireless access points 110 (e.g., service set identifier, wireless channel, media access control address, etc.) to facilitate identification. The resulting ordered list may therefore comprise a reference number of the wireless access points 110 having the highest probabilities of being available for reconnection (e.g., the top three wireless access points 110). In some embodiments, the ordered list of the wireless access points 110 may be arranged in a descending manner according to the probability determined for each.

In embodiments wherein the parameters computed by the analysis module 310 are instead embodied as one or more prediction programs (e.g., instructions, program sequences, etc.), the prediction module 306 may execute the previously generated prediction programs using the most recent connection information retrieved from the wireless connection database 214 and the desired time of prediction as inputs to generate the ordered list of the wireless access points 110. In such embodiments, the resulting ordered list may similarly comprise a reference number of the wireless access points 110 having the highest probabilities of being available for reconnection (e.g., the top three wireless access points 110). Additionally or alternatively, the ordered list of the wireless access points 110 may be arranged in a descending manner according to the probability determined for each.

To reduce the amount of time needed to re-establish a wireless connection, the wireless connection management module 304 may instruct the wireless communication module 308 to transmit a probe or a directed connection request to one or more of the wireless access points 110 based at least in part on, or otherwise as a function of, the ordered list. If one or more of the wireless access points 110 are in range of or are otherwise available to the computing device 102 when probed, the one or more in-range wireless access points 110 can generate and thereafter transmit a response to the probe. Upon receipt of a probe response, the wireless connection management module 304 may instruct the wireless communication module 308 to re-establish a wireless connection with the wireless access point 110 that generated the response. By predicting and directly probing the wireless access points 110 that are most likely to be available to re-establish a wireless connection at a given time, the computing device 102 need not scan for available wireless access points, which typically takes a noticeable amount of time to complete. In that way, the time needed to re-establish a wireless connection may be reduced. If, however, none of the wireless access points 110 are in range of or otherwise available to the computing device 102 when probed, the wireless connection management module 304 may instead instruct the wireless communication module 308 to initiate a scan to identify other wireless access points 110 located in the proximity of the computing device 102.

Referring now to FIGS. 4 and 5, at least one embodiment of a method 400 for predicting available wireless access points 110 to reduce the wireless reconnection time between a wireless access point 110 and the computing device 102 begins with block 402. In block 402, the computing device 102 may record connection information corresponding to one or more past or present wireless connections established between the computing device 102 and the one or more wireless access points 110. The connection information may comprise information describing the wireless connections themselves (e.g., connection start time and date, connection end time and date, connection duration, etc.) or information describing characteristics or data associated with the one or more wireless access points 110 with which the computing device 102 connects (e.g., service set identifier, wireless channel, media access control address, etc.). The computing device 102 may store the recorded connection information in a database (e.g., the wireless connection database 214). In some embodiments, the connection information may also be stored in a log file or in any other format suitable to store information associated with one or more past or present wireless connections between the computing device 102 and the one or more wireless access points 110.

In block 404, the computing device 102 computes one or more parameters and/or prediction programs, which may later be used to facilitate predicting which of the one or more wireless access points 110, or the group 160, 170 of the one or more wireless access points 110, is most likely to be in range of the computing device 102 at a particular time (e.g., a desired time of prediction). To do so, the computing device 102 may utilize one or more artificial intelligence-based techniques to compute or otherwise generate the parameters and/or prediction programs a function of the historical connection information stored in the log or the database. In some embodiments, the computing device utilizes one or more genetic algorithms and/or genetic programming techniques to generate the parameters and/or prediction programs. Each parameter and/or prediction program may be indicative of or otherwise correspond to a different connection probability computed from the historical connection information. At completion, or at any appropriate time during computation, the computing device 102 may store the computed parameters and/or prediction programs in one or more databases (e.g., the parameter database 216). Upon storing the computed parameters and/or prediction programs in one or more databases, the method 400 advances to block 406.

In some embodiments, the computing device 102 may detect whether any operations are currently being performed and/or whether the computing device 102 is currently in use (e.g., active) prior to computing the one or more parameters and/or prediction programs. To do so, the computing device 102 of such embodiments, may monitor for the performance of one or more operations and/or processes. Additionally or alternatively, the computing device 102 may monitor for input received from a user via one or more of the peripheral devices 220 (i.e., keypads, touch screens, voice recognition components, etc.) of the computing device 102. In response to determining that the computing device 102 is actively being used and/or not connected to a power source, the computing device 102 may proceed with computing the one or more parameters and/or prediction programs. If, however, it is instead determined that the computing device 102 is actively being used and/or not connected to a power source, the computing device 102 may continue to monitor device activity and/or operations for inactivity before computing the one or more parameters and/or prediction programs. Since the computing device 102 is inactive and/or connected to a power source when computing parameters and/or prediction programs, such computations are asynchronous to other operations or use of the computing device. In that way, resources (e.g., battery power, processing power, etc.) of the computing device 102 may be reserved for other operations.

At block 406, the computing device 102 determines whether re-establishment of a wireless connection has been requested. To do so, the computing device 102 may monitor, in some embodiments, for input received from a user via one or more of the peripheral devices 220 (i.e., keypads, touch screens, voice recognition components, etc.) of the computing device 102. The input may be indicative of a request by the user to re-establish a wireless connection with one of the wireless access points 110. Additionally or alternatively, the computing device 102 may monitor for a notification and/or indication generated by one or more components or operations of the computing device 102. If the computing device 102 determines that re-establishment of a wireless connection has been requested, the method 400 advances to block 408. If the computing device 102 instead determines that re-establishment of a wireless connection has not been requested, the method 400 proceeds back to block 402 in which the computing device 102 continues recording connection information corresponding to one or more past or present wireless connections established between the computing device 102 and the one or more wireless access points 110.

At block 408, the computing device 102 retrieves the computed parameters and the historical connection information to facilitate predicting one or more of the wireless access points may be available for re-establishing a connection. To do so, the computing device 102 retrieves, at block 410, the parameters and/or prediction programs from the parameter database 216. Additionally, the computing device 102 retrieves, at block 412, additional wireless connection information from the wireless connection database 214. In some embodiments, the additional wireless connection information retrieved from the wireless connection database 214 may include the most recent connection information stored in the log by the computing device 102. That is, the most recent connection information retrieved from the wireless connection database 214 may include wireless information corresponding to one or more recent wireless connections for which the computing device 102 has not yet computed into a parameter or a prediction program. After retrieving the parameters and the additional connection information (e.g., the most recently recorded connection information), the method 400 advances to block 414.

In block 414, the computing device 102 generates an ordered list comprising a reference number of the wireless access points 110 having the highest probabilities of being available for reconnection. For example, the computing device 102 may generate an ordered list comprising the top three wireless access points 110, which may correspond to the three wireless connections having the highest determined probabilities of being available to re-establish a wireless connection. In some embodiments, the ordered list of the wireless access points 110 may be arranged in a descending manner according to the probability determined for each. Upon generating the ordered list, the method 400 advances to block 416.

In block 416, the computing device 102 transmits a probe or a directed connection request to one or more of the wireless access points 110 of the ordered list. In some embodiments, the computing device 102 may transmit probes in a descending manner according to the probability determined for each of the wireless access points 110 of the ordered list. As such, the computing device 102 may first transmit a probe to the wireless access point 110 having the highest determined probability of being available to re-establish a wireless connection before transmitting a probe to another wireless access point 110 of the ordered list. For example, if the ordered list generated by the computing device 102 comprises four of the wireless access points 110 (e.g., AP 122, AP 124, AP 126, and AP 128), the computing device 102 may first transmit a probe to the AP 122 before transmitting a probe to the AP 124, AP 126, or AP 128. The method 400 then advances to block 418.

In block 418, the computing device 102 determines whether it received a response to the probe from the wireless access point 110 to which the probe was directed. That is, if the wireless access point 110 to which the probe was directed (e.g., AP 122) is in range and available to re-establish a wireless connection with the computing device 102, the wireless access point 110 to which the probe was directed (e.g., AP 122) may transmit a response to the probe, which may be received by the computing device 102. If the computing device 102 receives a response from the wireless access point 110 to which the probe was directed, the method 400 advances to block 420. If, however, the computing device 102 does not receive a response from the wireless access point 110 to which the probe was directed, the method 400 advances instead to block 422.

In block 422, the computing device 102 determines whether the wireless access point 110 to which the probe was directed is the last wireless access point 110 of the ordered list. If the computing device 102 determines that the wireless access point 110 to which the probe was directed is not the last wireless access point 110 of the ordered list, the method 400 returns to block 416 to probe the next wireless access point 110 of the ordered list (e.g., the wireless access point 110 having the next highest probability). If, however, the computing device 102 determines that the wireless access point 110 to which the probe was directed is the last wireless access point 110 of the ordered list, the method 400 advances to block 424. In block 424, the computing device 102 may initiate a scan to identify other wireless access points 110 located in the proximity of the computing device 102.

In block 420, the computing device 102 may re-establish a wireless connection with the wireless access point 110 to which the probe was directed and a response was received therefrom. By predicting and directly probing the wireless access points 110 that are most likely to be available to re-establish a wireless connection at a given time, the computing device 102 need not scan for available wireless access points 110, which typically takes a noticeable amount of time to complete. In that way, the time needed to re-establish a wireless connection may be reduced.

It should be understood that although the computing device 102 of the illustrative embodiment transmits probes in a descending order according to the probability determined for each of the wireless access points 110 of the ordered list, the computing device 102 may also contemporaneously (e.g., simultaneously) transmit a probe to each wireless access point 110 of the ordered list in some embodiments. In such embodiments, the computing device 102 may instead determine, at block 418, whether it received a response to the probes from any one of the wireless access points 110 to which the probes were directed. If the computing device 102 receives a response from any one of the wireless access points 110 to which the probes were directed, the computing device 102 may re-establish a wireless connection with one or more of the wireless access points 110 that transmitted a response. In some embodiments, the computing device 102 may re-establish a wireless connection with the wireless access point 110 first to respond to the probe. It should be understood, however, that the computing device 102 may instead determine to re-establish a wireless connection with any of the one or more wireless access points 110 according to a policy (e.g., strongest signal strength, device security policies, user preferences, etc.) or any other suitable mechanism for selecting one of the responding wireless access points 110 with which to re-establish a wireless connection.

Referring now to FIG. 6, at least one embodiment of a method for computing parameters with the computing device 102 to predict an available wireless access point begins with block 602. In block 602, the computing device 102 may retrieve connection information corresponding to one or more past or present wireless connections established between the computing device 102 and the one or more wireless access points 110 from a database (e.g., the wireless connection database 214). The connection information may comprise information describing the wireless connections themselves (e.g., connection start time and date, connection end time and date, connection duration, etc.) or information describing characteristics or data associated with the one or more wireless access points 110 with which the computing device 102 connects (e.g., service set identifier, wireless channel, media access control address, etc.). After retrieving the connection information, the method 600 advances to block 604.

In block 604, the computing device 102 computes one or more parameters and/or prediction programs, which may later be used to facilitate predicting which of the one or more wireless access points 110, or the group 160, 170 of the one or more wireless access points 110, is most likely to be in range of the computing device 102 at a particular time (e.g., a desired time of prediction). To do so, the computing device 102 may utilize one or more artificial intelligence-based techniques to compute or otherwise generate the parameters and/or prediction programs a function of the historical connection information stored in the log or the database. In some embodiments, the computing device utilizes one or more genetic algorithms and/or genetic programming techniques to generate the parameters and/or prediction programs. Each parameter and/or prediction program may be indicative of or otherwise correspond to a different connection probability computed from the historical connection information. After completion or at any appropriate time during computation of the parameters and/or prediction programs, the method 600 advances to block 606. In block 606, the computing device 102 may store the computed parameters and/or prediction programs in one or more databases (e.g., the parameter database 216). In some embodiments, the computed parameters may later be used to facilitate predicting which of the one or more wireless access points 110, or the group 160, 170 of the one or more wireless access points 110, is most likely (e.g., most probable) to be in range of the computing device 102 at a given time.

EXAMPLES

Illustrative examples of the devices, systems, and methods disclosed herein are provided below. An embodiment of the devices, systems, and methods may include any one or more, and any combination of, the examples described below.

Example 1 includes a computing device for reducing a connection time to a wireless access point, the computing device includes a wireless connection logging module to record in a log stored on the computing device, wireless connection information for a plurality of wireless connections with one or more wireless access points, the log includes historical wireless connection information; an analysis module to calculate parameters based at least in part on the historical wireless connection information; a prediction module to generate an ordered list of the one or more wireless access points to connect to at a desired time based at least in part on the parameters; a wireless connection management module to select a first wireless access point from the ordered list with which to attempt a connection; and a wireless communication module to send a probe frame to the selected first wireless access point.

Example 2 includes the subject matter of Example 1, and wherein the log further includes additional wireless connection information not yet used in the calculation of the parameters by the analysis module, and wherein to generate an ordered list of the one or more wireless access points to connect to at a desired time based at least in part on the parameters includes to generate an ordered list of the one or more wireless access points to connect to at a desired time based at least in part on the parameters and the additional wireless connection information.

Example 3 includes the subject matter of any of Examples 1 and 2, and wherein each parameter includes a prediction program generated using a genetic programming operation, and wherein to generate an ordered list of the one or more wireless access points to connect to at a desired time includes to execute the prediction program for each parameter to generate the ordered list of the one or more wireless access points.

Example 4 includes the subject matter of any of Examples 1-3, and wherein each parameter includes a probability computed based at least in part on the historical wireless connection information.

Example 5 includes the subject matter of any of Examples 1-4, and wherein the prediction module further to assign the probability computed for each parameter to a different additional wireless connection of the plurality of wireless connections recorded in the log.

Example 6 includes the subject matter of any of Examples 1-5, and wherein the prediction module further to identify a wireless access point corresponding to each additional wireless connection recorded in the log.

Example 7 includes the subject matter of any of Examples 1-6, and wherein the ordered list includes the one or more wireless access points arranged in descending order according to the corresponding probability assigned to each different additional wireless connection recorded in the log.

Example 8 includes the subject matter of any of Examples 1-7, and wherein to identify a wireless access point corresponding to each additional wireless connection recorded in the log includes to identify a wireless access point corresponding to each additional wireless connection recorded in the log based at least in part on one or more of a service set identifier, a wireless channel, and a media access control address associated with each wireless access point recorded in the log.

Example 9 includes the subject matter of any of Examples 1-8, and wherein the wireless connection management module further to establish a connection with the selected first wireless access point in response to the wireless communication module receiving a response to the probe frame from the selected first wireless access point.

Example 10 includes the subject matter of any of Examples 1-9, and wherein the wireless connection management module further to select a second wireless access point from the ordered list with which to attempt a connection in response to the wireless communication module not receiving a response to the probe frame from the first wireless access point.

Example 11 includes the subject matter of any of Examples 1-10, and wherein the wireless communication module to send a probe frame to the first wireless access point includes to send a first probe frame to the first wireless access point, and wherein the wireless connection management module further to send a second probe frame to the selected second wireless access point in response to not receiving a response to the first probe frame from the first wireless access point.

Example 12 includes the subject matter of any of Examples 1-11, and wherein the wireless connection management module further to initiate a scan to locate one or more other wireless access points in response to the wireless communication module not receiving a response to the probe frame from any of the wireless access points of the ordered list.

Example 13 includes the subject matter of any of Examples 1-12, and wherein to send a probe frame to the selected first wireless access point includes to send a first probe frame to the selected first wireless access point, wherein the wireless connection management module further to select a second wireless access point and a third wireless access point from the ordered list with which to attempt a connection, wherein the wireless communication module further to send a second probe frame to the selected second wireless access point and a third probe frame to the selected third wireless access point contemporaneously with sending the first probe frame to the selected first wireless access point, and wherein the wireless connection management module further to establish a connection with one of the selected first, second, or third wireless access points in response to the wireless communication module receiving a response to the probe frame from one of the corresponding selected first, second, or third wireless access points.

Example 14 includes the subject matter of any of Examples 1-13, and wherein the analysis module to calculate the parameters when the computing device is not in use by a user of the computing device.

Example 15 includes the subject matter of any of Examples 1-14, and wherein the analysis module to calculate the parameters only when the computing device is coupled to a power adaptor.

Example 16 includes the subject matter of any of Examples 1-15, and wherein the analysis module to calculate the parameters based at least in part on a reference interval.

Example 17 includes a method for reducing a connection time to a wireless access point, the method including recording, on a computing device, in a log stored on the computing device, wireless connection information for a plurality of wireless connections with one or more wireless access points, the log includes historical wireless connection information; calculating, on the computing device, parameters based at least in part on the historical wireless connection information; generating, on the computing device, an ordered list of the one or more wireless access points to connect to at a desired time based at least in part on the parameters; selecting, on the computing device, a first wireless access point from the ordered list with which to attempt a connection; and sending, on the computing device, a probe frame to the selected first wireless access point.

Example 18 includes the subject matter of Example 17, and wherein the log further includes additional wireless connection information not yet used in the calculation of the parameters, and wherein generating an ordered list of the one or more wireless access points to connect to at a desired time based at least in part on the parameters includes generating an ordered list of the one or more wireless access points to connect to at a desired time based at least in part on the parameters and the additional wireless connection information.

Example 19 includes the subject matter of any of Examples 17 and 18, and further including generating, on the computing device, a prediction program for each parameter using a genetic programming operation, and wherein generating an ordered list of the one or more wireless access points to connect to at a desired time includes executing the prediction program from each parameter to generate the ordered list of the one or more wireless access points.

Example 20 includes the subject matter of any of Examples 17-19, and wherein each parameter includes a probability computed based at least in part on the historical wireless connection information.

Example 21 includes the subject matter of any of Examples 17-20, and further including assigning, on the computing device, the probability computed for each parameter to a different additional wireless connection of the plurality of wireless connections recorded in the log.

Example 22 includes the subject matter of any of Examples 17-21, and further including identifying, on the computing device, a wireless access point corresponding to each additional wireless connection recorded in the log.

Example 23 includes the subject matter of any of Examples 17-22, and wherein the ordered list includes the one or more wireless access points arranged in descending order according to the corresponding probability assigned to each different additional wireless connection recorded in the log.

Example 24 includes the subject matter of any of Examples 17-23, and wherein identifying a wireless access point corresponding to each additional wireless connection recorded in the log includes indentifying a wireless access point corresponding to each additional wireless connection recorded in the log based at least in part on one or more of a service set identifier, a wireless channel, and a media access control address associated with each wireless access point recorded in the log.

Example 25 includes the subject matter of any of Examples 17-24, and further including establishing, on the computing device, a connection with the selected first wireless access point in response to receiving a response to the probe frame from the selected first wireless access point.

Example 26 includes the subject matter of any of Examples 17-25, and further including selecting, on the computing device, a second wireless access point from the ordered list with which to attempt a connection in response to not receiving a response to the probe frame from the first wireless access point.

Example 27 includes the subject matter of any of Examples 17-26, and wherein sending a probe frame to the first wireless access point includes sending a first probe frame to the first wireless access point, and wherein the method further including sending, on the computing device, a second probe frame to the selected second wireless access point in response to not receiving a response to the first probe frame from the first wireless access point.

Example 28 includes the subject matter of any of Examples 17-27, and further including initiating, on the computing device, a scan to locate one or more other wireless access points in response to not receiving a response to the probe frame from any of the wireless access points of the ordered list.

Example 29 includes the subject matter of any of Examples 17-28, and wherein sending a probe frame to the selected first wireless access point includes sending a first probe frame to the selected first wireless access point; and wherein the method further including selecting, on the computing device, a second wireless access point and a third wireless access point from the ordered list with which to attempt a connection, sending, on the computing device, a second probe frame to the selected second wireless access point and a third probe frame to the selected third wireless access point contemporaneously with sending the first probe frame to the selected first wirelesses access point, and establishing, on the computing device, a connection with one of the selected first, second, or third wireless access points in response to the receiving a response to the probe frame from one of the corresponding selected first, second, or third wireless access points.

Example 30 includes the subject matter of any of Examples 17-29, and wherein calculating parameters based at least in part on the historical wireless connection information includes calculating parameters when the computing device is not in use by a user of the computing device.

Example 31 includes the subject matter of any of Examples 17-30, and wherein calculating parameters based at least in part on the historical wireless connection information includes calculating parameters only when the computing device is coupled to a power adaptor.

Example 32 includes the subject matter of any of Examples 17-31, and wherein calculating parameters based at least in part on the historical wireless connection information includes calculating parameters based at least in part on a reference interval.

Example 33 includes a computing device for reducing a connection time to a wireless access point, the computing device including a processor; and a memory having stored therein a plurality of instructions that, when executed by the processor, cause the computing device to perform the method of any of Examples 17-32.

Example 34 includes one or more machine readable storage media including a plurality of instructions stored thereon that, in response to being executed, result in a computing device performing the method of any of Examples 17-32.

The invention claimed is:

1. A computing device for reducing a connection time to a wireless access point, the computing device comprising:
    wireless connection logging circuitry to record in a log stored on the computing device, wireless connection information for a plurality of wireless connections with one or more wireless access points, wherein the log comprises historical wireless connection information;
    analysis circuitry to calculate parameters based at least in part on the historical wireless connection information, wherein each parameter comprises a probability calculated based at least in part on the historical wireless connection information;
    prediction circuitry to (i) assign the probability calculated for each parameter to a different wireless connection of the plurality of wireless connections recorded in the log, and (ii) generate an ordered list of the one or more wireless access points to connect to at a desired time based at least in part on the parameters;
    wireless connection management circuitry to select a first wireless access point from the ordered list with which to attempt a connection; and
    wireless communication circuitry to send a probe frame to the selected first wireless access point.

2. The computing device of claim 1, wherein the log further comprises additional wireless connection information not yet used in the calculation of the parameters by the analysis circuitry, and
    wherein to generate the ordered list of the one or more wireless access points to connect to at the desired time based at least in part on the parameters comprises to generate the ordered list of the one or more wireless access points to connect to at the desired time based at least in part on the parameters and the additional wireless connection information.

3. The computing device of claim 2, wherein each parameter comprises a prediction program generated using a genetic programming operation, and
    wherein to generate the ordered list of the one or more wireless access points to connect to at the desired time comprises to execute the prediction program for each parameter to generate the ordered list of the one or more wireless access points.

4. The computing device of claim 2, wherein the prediction circuitry further to identify a wireless access point corresponding to each additional wireless connection recorded in the log.

5. The computing device of claim 4, wherein the ordered list comprises the one or more wireless access points arranged in descending order according to the corresponding probability assigned to each different additional wireless connection recorded in the log.

6. The computing device of claim 4, wherein to identify a wireless access point corresponding to each additional wireless connection recorded in the log comprises to identify a wireless access point corresponding to each additional wireless connection recorded in the log based at least in part on one or more of a service set identifier, a wireless channel, and a media access control address associated with each wireless access point recorded in the log.

7. The computing device of claim 2, wherein the wireless connection management circuitry further to establish a connection with the selected first wireless access point in response to the wireless communication circuitry receiving a response to the probe frame from the selected first wireless access point.

8. The computing device of claim 2, wherein the wireless communication circuitry to send a probe frame to the first wireless access point comprises to send a first probe frame to the first wireless access point, and
wherein the wireless connection management circuitry further to (i) select a second wireless access point from the ordered list with which to attempt a connection in response to the wireless communication circuitry not receiving a response to the probe frame from the first wireless access point and (ii) send a second probe frame to the selected second wireless access point in response to not receiving a response to the first probe frame from the first wireless access point.

9. The computing device of claim 2, wherein the wireless connection management circuitry further to initiate a scan to locate one or more other wireless access points in response to the wireless communication circuitry not receiving a response to the probe frame from any of the wireless access points of the ordered list.

10. The computing device of claim 2, wherein to send a probe frame to the selected first wireless access point comprises to send a first probe frame to the selected first wireless access point,
wherein the wireless connection management circuitry further to select a second wireless access point and a third wireless access point from the ordered list with which to attempt a connection,
wherein the wireless communication circuitry further to send a second probe frame to the selected second wireless access point and a third probe frame to the selected third wireless access point contemporaneously with sending the first probe frame to the selected first wireless access point, and
wherein the wireless connection management circuitry further to establish a connection with one of the selected first, second, or third wireless access points in response to the wireless communication circuitry receiving a response to the probe frame from one of the corresponding selected first, second, or third wireless access points.

11. The computing device of claim 2, wherein the analysis circuitry to calculate the parameters when the computing device is not in use by a user of the computing device.

12. The computing device of claim 2, wherein the analysis circuitry to calculate the parameters only when the computing device is coupled to a power adaptor.

13. The computing device of claim 2, wherein the analysis circuitry to calculate the parameters based at least in part on a reference interval.

14. A method for reducing a connection time to a wireless access point, the method comprising:
recording, on a computing device, in a log stored on the computing device, wireless connection information for a plurality of wireless connections with one or more wireless access points, wherein the log comprises historical wireless connection information;
calculating, on the computing device, parameters based at least in part on the historical wireless connection information, wherein each parameter comprises a probability calculated based at least in part on the historical wireless connection information;
assigning, on the computing device, the probability calculated for each parameter to a different wireless connection of the plurality of wireless connections recorded in the log;
generating, on the computing device, an ordered list of the one or more wireless access points to connect to at a desired time based at least in part on the parameters;
selecting, on the computing device, a first wireless access point from the ordered list with which to attempt a connection; and
sending, on the computing device, a probe frame to the selected first wireless access point.

15. The method of claim 14, wherein the log further comprises additional wireless connection information not yet used in the calculation of the parameters, and
wherein generating the ordered list of the one or more wireless access points to connect to at the desired time based at least in part on the parameters comprises generating the ordered list of the one or more wireless access points to connect to at the desired time based at least in part on the parameters and the additional wireless connection information.

16. The method of claim 15, further comprising generating, on the computing device, a prediction program for each parameter using a genetic programming operation, and
wherein generating the ordered list of the one or more wireless access points to connect to at the desired time comprises executing the prediction program from each parameter to generate the ordered list of the one or more wireless access points.

17. The method of claim 15, further comprising:
identifying, on the computing device, a wireless access point corresponding to each additional wireless connection recorded in the log,
wherein the ordered list comprises the one or more wireless access points arranged in descending order according to the corresponding probability assigned to each different additional wireless connection recorded in the log.

18. The method of claim 15, further comprising establishing, on the computing device, a connection with the selected first wireless access point in response to receiving a response to the probe frame from the selected first wireless access point.

19. The method of claim 15, wherein sending a probe frame to the first wireless access point comprises sending a first probe frame to the first wireless access point, and wherein the method further comprising:
selecting, on the computing device, a second wireless access point from the ordered list with which to attempt a connection in response to not receiving a response to the probe frame from the first wireless access point;
sending, on the computing device, a second probe frame to the selected second wireless access point in response to not receiving a response to the first probe frame from the first wireless access point; and
initiating, on the computing device, a scan to locate one or more other wireless access points in response to not receiving a response to the probe frame from the first and second wireless access points.

20. The method of claim 15, wherein calculating parameters based at least in part on the historical wireless connection information comprises at least one of: calculating parameters when the computing device is not in use by a user of the computing device; calculating parameters only when the computing device is coupled to a power adaptor; or calculating parameters based at least in part on a reference interval.

21. One or more non-transitory, machine readable storage media comprising a plurality of instructions stored thereon that, in response to being executed, result in a computing device:

recording wireless connection information for a plurality of wireless connections with one or more wireless access points in a log stored on the computing device, wherein the log comprises historical wireless connection information;

calculating parameters based at least in part on the historical wireless connection information, wherein each parameter comprises a probability calculated based at least in part on the historical wireless connection information;

assigning the probability calculated for each parameter to a different wireless connection of the plurality of wireless connections recorded in the log;

generating an ordered list of the one or more wireless access points to connect to at a desired time based at least in part on the parameters;

selecting a first wireless access point from the ordered list with which to attempt a connection; and sending a probe frame to the selected first wireless access point.

22. The one or more non-transitory, machine readable storage media of claim 21, wherein the log further comprises additional wireless connection information not yet used in calculating the parameters, and wherein generating the ordered list of the one or more wireless access points to connect to at the desired time based at least in part on the parameters comprises generating the ordered list of the one or more wireless access points to connect to at the desired time based at least in part on the parameters and the additional wireless connection information.

23. The one or more non-transitory, machine readable storage media of claim 22, wherein each calculated parameter comprises a prediction program generated using a genetic programming operation, and wherein generating the ordered list of the one or more wireless access points to connect to at the desired time comprises executing the prediction program from each parameter to generate the ordered list of the one or more wireless access points.

24. The one or more non-transitory, machine readable storage media of claim 22, wherein the one or more machine readable storage media further comprising instructions that, in response to being executed, result in the computing device identifying a wireless access point corresponding to each additional wireless connection recorded in the log, wherein the ordered list comprises the one or more wireless access points arranged in descending order according to the corresponding probability assigned to each different additional wireless connection recorded in the log.

25. The one or more non-transitory, machine readable storage media of claim 22, media further comprising instructions that, in response to being executed, result in the computing device establishing a connection with the selected first wireless access point in response to receiving a response to the probe frame from the selected first wireless access point.

\* \* \* \* \*